United States Patent

[11] 3,618,128

[72] Inventor George P. Houcke
Rumson, N.J.
[21] Appl. No. 825,624
[22] Filed May 19, 1969
[45] Patented Nov. 2, 1971
[73] Assignee Bell Telephone Laboratories Incorporated
Murray Hill, Berkeley Heights, N.J.

[54] TWO-WAY SIGNALING CIRCUIT EMPLOYING A COMMON OSCILLATOR HAVING A FEEDBACK TRANSFORMER TOY PROVIDING DC ISOLATION BETWEEN SIGNAL SOURCES
2 Claims, 1 Drawing Fig.

[52] U.S. Cl. .......... 331/60, 331/112, 331/149, 331/173
[51] Int. Cl. .......... H03b 5/00
[50] Field of Search .......... 331/112, 60, 113 A, 149, 173

[56] References Cited
UNITED STATES PATENTS

| | | | |
|---|---|---|---|
| 3,139,595 | 6/1964 | Barber | 331/112 X |
| 3,219,844 | 11/1965 | Martin | 331/112 X |
| 3,310,754 | 3/1967 | Stewart | 331/149 X |
| 3,308,397 | 3/1967 | Morgan | 331/113 |

*Primary Examiner*—Roy Lake
*Assistant Examiner*—James B. Mullins
*Attorneys*—R. J. Guenther and Kenneth B. Hamlin

ABSTRACT: Two-way signaling between a line loop and local terminals is accomplished by directly applying the line loop signals to an oscillator to alternatively turn on and turn off the oscillator and by applying the local terminal signals across the secondary winding of a transformer whose primary winding is in the oscillator feedback circuit to modify the reflected impedance across the primary winding and thus alternatively turn on and turn off the oscillator. The loop signals are recovered by a circuit coupled to the secondary winding and the local signals are applied to the loop by a circuit coupled to the primary winding to provide duplex signaling and, by virtue of the transformer, direct current isolation.

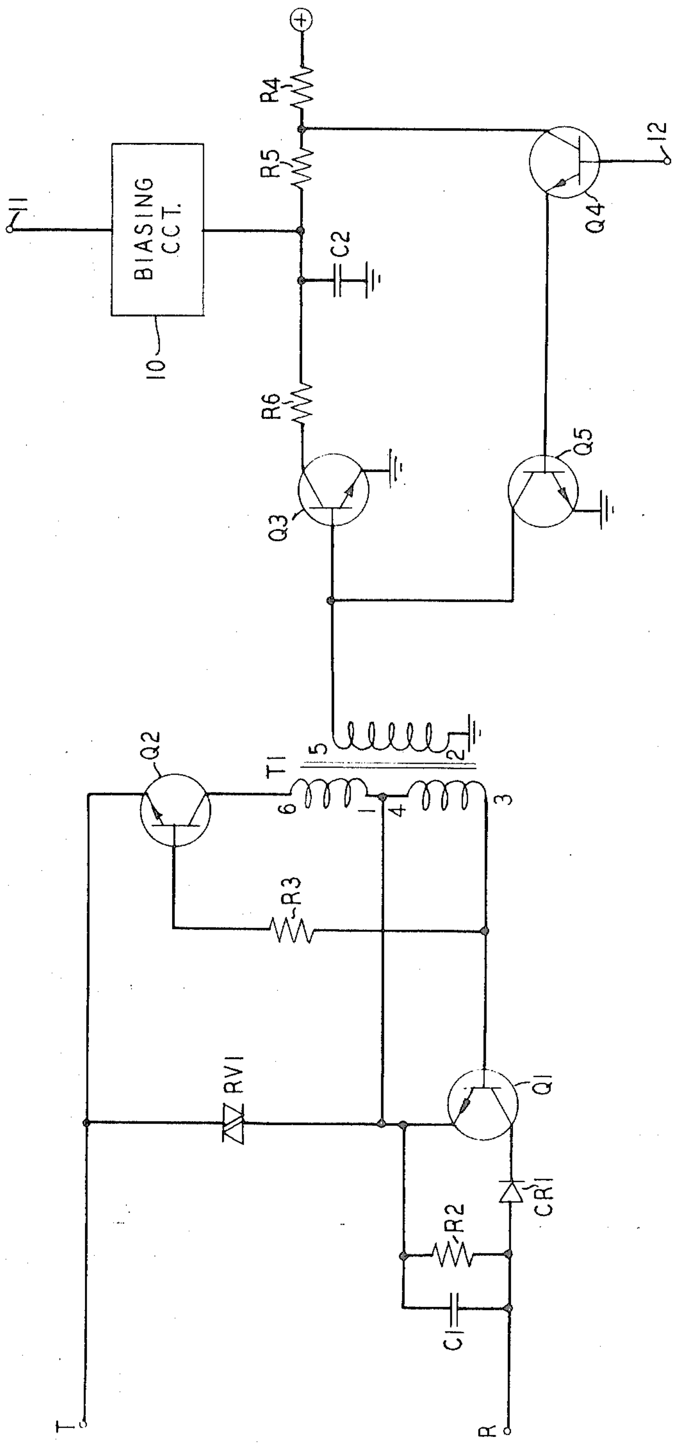
INVENTOR
G. P. HOUCKE
BY RC Lipton
ATTORNEY

TWO-WAY SIGNALING CIRCUIT EMPLOYING A COMMON OSCILLATOR HAVING A FEEDBACK TRANSFORMER TOY PROVIDING DC ISOLATION BETWEEN SIGNAL SOURCES

FIELD OF THE INVENTION

This invention relates to two-way signaling circuits for interconnecting two signaling sources, such as a line loop and local terminals and, more particularly, to signaling circuits which monitor line loops to develop and apply to local terminals signal voltages corresponding to the line loop signals and which also apply signals to the line loops in response to locally generated signal voltages appearing on the local terminals.

DESCRIPTION OF THE PRIOR ART

Two-way signaling circuits have many uses, such as a termination for line loops which extend to remote stations. The circuits may thus be employed to monitor for incoming supervisory signals on the loop and to send outgoing supervisory signals over the loop to the station. Two-way signaling of this nature is useful in concentrator systems which, for example, interconnect data station line loops to data trunks in response to the data station bidding for a trunk by going "off-hook." In accordance therewith, the signaling circuit provides the functions of monitoring the line loop for "on-hook" and "off-hook" signals and signaling the remote station when a connection to a trunk is achieved.

Data stations often include local sources of power for developing the line loop signals. In these cases, it is necessary to isolate the concentrator power supply from the current supply on the line loops. The two-way signaling circuit is therefore arranged to provide direct current isolation between the concentrator circuit and the line loops. One preferably arrangement involves translating the loop signal to alternating current signals and passing the AC signals through a circuit which blocks the DC signal and alternatively converting the local signal voltages to AC signals which is similarly passed through a circuit which blocks the DC signal.

A specific circuit which provides DC isolation is called a DC to AC to DC converter. This circuit includes an oscillator directly coupled to a signal source and arranged to be modified in frequency (or turned on and turned off) by the signal voltages. The oscillator output is passed through the primary winding of a transformer, which winding may also constitute the oscillator feedback circuit. The oscillator signal is then recovered from the transformer secondary and reconverted to DC signal voltages. The signal voltages are therefore reproduced and, by virtue of the transformer, DC isolation is obtained between the input and the output of the converter circuit. When isolation is required for two-way signaling, however, a converter is required for each signaling direction. This includes a separate oscillator and associated transformer, items which are relatively expensive.

SUMMARY OF THE INVENTION

It is an object of this invention to reduce the cost of two-way signaling circuits which provide DC isolation. In accordance therewith, it is an object of this invention to provide a signaling circuit having common circuitry for sources which are DC isolated from each other and, more specifically, to provide a signaling circuit having a common oscillator and transformer for the signaling sources.

In accordance with an illustrative embodiment of this invention, a line loop is directly coupled to a transistor oscillator whereby the line loop signal varies the bias of the transistor to thereby modify the oscillator frequency by turning the oscillator on or off. It is a feature of this invention that the second source of signals (from the concentrator) is directly coupled to a secondary winding of a transformer whose primary winding is in the feedback circuit of the oscillator. This second source is arranged to modify the impedance across the secondary winding whereby the modified reflected impedance in the primary winding modifies, in turn, the oscillator frequency. Advantageously, the second source controls a switch connected across the secondary winding, which switch operates to short the secondary and thereupon squelch the oscillator.

The secondary winding of the transformer is also coupled to a circuit which recovers signal voltages from the oscillating wave developed by the oscillator and applies the signals to the concentrator. The loop signals are therefore passed to the concentrator with DC isolation maintained between the line loop and the concentrator circuits. It is another feature of the invention that a second output circuit is DC coupled to the primary winding of the transformer to recover signals from the oscillating wave and apply the signals to the line loop. In this manner, the concentrator signals are passed to the remote data station, DC isolation is maintained and substantial savings are obtained through the utilization of a common oscillator and transformer for two-way signaling.

BRIEF DESCRIPTION OF THE DRAWING

The foregoing and other objects and features of this invention will be fully understood from the following detailed description of an illustrative embodiment taken in conjunction with the accompanying drawing which shows, in schematic form, a two-way signaling circuit in accordance with this invention.

DETAILED DESCRIPTION

The two-way signaling circuit shown in the drawing is advantageously employed with a concentrator circuit (not shown) which is arranged to connect data station line loops to data trunk loops. Specifically, the two-way signaling circuit monitors the incoming signals on the station line loop and repeats these signals to the concentrator circuit. These incoming signals may comprise supervisory on-hook and off-hook signals developed by a remote data station and applied to the line loop. Alternatively (on a half duplex basis) the two-way signaling circuit accepts signals from the concentrator circuit, which signals may indicate whether a connection by the line loop to a two-way trunk loop has been achieved, and sends the signals to the station by way of the line loop.

Terminals T and R in the drawing are connected across the line loop. Specifically, terminal T is preferably connected to the tip lead of the line loop and terminal R is connected to the ring lead. The incoming signals on the line loop from the remote data station are monitored by an oscillator circuit on the line loop side of the signaling circuit. This oscillator circuit which is alternatively turned on or off, comprises transistor Q2 and the collector-to-base feedback path consisting of the primary winding of transformer Tl (windings 6, 1 and 4, 3) and resistor R3. In this description, the circuit elements between transformer Tl and the line loop are considered as being on the line loop side of the signaling circuit.

The signals returned to the line loop by the two-way signal circuit involve the presentation of a high impedance or low impedance across terminals T and R in a manner described hereinafter. Development of these signals is provided by transistor Q1.

On the concentrator side of the signaling circuit (those circuit elements between concentrator terminals 11 and 12 and transformer T1) the signals from the concentrator circuit are applied to terminal 12 and are repeated by transistors Q4 and Q5 and thereupon supplied to the secondary winding of transformer T1. Incoming line loop signals monitored by the line loop side are passed through transformer T1 and transistor Q3 and then by way of biasing circuit 10 and terminal 11 to the concentrator circuit as described in detail hereinafter.

It is seen that transformer T1 provides direct current isolation between the line loop side of the two-way signaling circuit and the concentrator side. This is a necessary feature in many concentrator arrangements where it is necessary to isolate the power supply of the concentrator circuit from the power supply of the various data stations, each line loop being connected to the associated data station power supply.

When the data station is on-hook the station power supply is disconnected from the loop and no voltage appears at terminals T and R. Oscillator Q2 is therefore turned off. With the oscillator turned off the secondary winding 5, 2 of transformer T1 does not develop any current therethrough. Accordingly, ground is applied to the base of transistor Q3 and the transistor is accordingly also turned off. Capacitor C2 thereupon charges by way of resistors R4 and R5. Positive potential is thereupon applied to biasing circuit 10 and in response thereto a biasing signal is developed which may advantageously be applied to logic and gate circuits in the concentrator. For example, the biasing signal may be applied to disable a gate circuit to indicate that the data station connected to the line loop is on-hook.

When the data station is off-hook a positive voltage appears at terminal R and a voltage which is negative with respect to terminal R appears at terminal T. Current thereupon flows through resistor R2 and reversely poled diodes RV1. A voltage drop is therefore developed across reversely poled diodes RV1 and the voltage applied to the center tap of the primary windings of transformer T1 is positive with respect to terminal T. This relatively positive voltage is then passed through resistor R3 to the base of transistor Q2. Transistor Q2 is therefore forward biased and therefore tends to turn on. With feedback being provided by the primary winding of transformer T1 and feedback resistor R3, the circuit is thus arranged to oscillate unless, as described hereinafter, the concentrator is signaling that a connection with a trunk loop has been achieved.

During the positive cycle of each oscillation of transistor Q2, a relatively positive potential is applied by primary winding of transformer T1 to the base of transistor Q1. Transistor Q1 is therefore forward biased and tends to turn on. This shunts resistor R2 by way of diode CR1 and the collector-to-emitter path of transistor Q1 and therefore tends to discharge capacitor C1. During the negative cycle of each oscillation capacitor C1 maintains the voltage across resistor R2 close to zero. Accordingly, with oscillator Q2 operated, resistor R2 is shunted and the circuit presents a relatively low impedance across terminals T and R. This in turn maintains a relatively high current flow in the loop indicating to the remote data station that a connection to an idle trunk has not yet been achieved.

The secondary winding 2, 5 of transfer T1 AC couples the oscillations of transistor Q2 to the base of transistor Q3. Accordingly, transistor Q3 turns on during the positive half of the cycles. This provides a low collector-to-emitter impedance path to ground through transistor Q3 and capacitor C2 discharges through resistor R6. The voltage on capacitor C2 is maintained relatively close to ground during the second half of the cycle by arranging capacitor C2 and resistors R4 and R5 to have a large time constant. Accordingly, with the data station off-hook, a signal voltage relatively close to ground is applied to biasing circuit 10. Biasing circuit 10 thereupon reverses the biasing voltage applied to terminal 11 and thus to the various gating and logic circuits of the concentrator.

As previously disclosed the signal circuit presents a low impedance across terminals T and R before a connection to an idle trunk is achieved. When a free trunk is seized by the line loop the concentrator applies a positive potential to terminal 12. This potential is applied to the base of transistor Q4, forward biasing the base-to-emitter junction. Transistor Q4 thereupon turns on and, with the collector connected to the junction of resistors R4 and R5, a positive voltage with respect to ground is passed through the emitter to the base of transistor Q5 turning on the latter transistor.

With transistors Q4 and Q5 turned on, a relatively low impedance is provided from the junction of resistors R4 and R5 through the collector-to-emitter path of transistor Q4 and through the base-to-emitter path of transistor Q5. This drops the potential at the junction of resistors R4 and R5 close to ground and discharges in turn capacitor C2. The input of biasing circuit 10 is thereupon clamped close to ground, whereby, so long as the trunk is connected to the line loop, biasing circuit 10 provides a biasing signal to terminal 11 indicating that the remote data station is off-hook.

When transistor Q5 turns on, the collector-to-emitter path shunts the secondary winding of transfer T1. This rapidly builds the alternating flow of current through the secondary winding and therefore tends to saturate the transformer core, simulating a low impedance which is reflected in the primary windings of transformer T1. Buildup of current in the primary windings is thus inhibited. Since the primary windings are in the feedback path of oscillator Q2 the oscillator is squelched. Transformer Q1 thereupon turns off removing the shunt around resistor R2. Accordingly, resistor R2 is reinserted across terminals T and R and the application of the high impedance across the line loop indicates to the data station that a connection has been achieved with an idle trunk.

It is contemplated in accordance with one arrangement that in the event that a connection with an idle trunk cannot be achieved a "camp-on" signal is generated and transmitted to the data station. This "camp-on" signal developed by the concentrator comprises a positive pulse which is periodically applied to terminal 12. Under control of this pulse transistors Q4 and Q5 turn on for the pulse length whereupon oscillator Q2 is momentarily squelched, momentarily removing, in turn, the shunt around resistor R2 to momentarily insert the high impedance path across terminals T and R. This momentary signal is in turn recognized at the data station as a "camp-on" signal.

Although a specific embodiment has been shown and described it will be understood that various modifications may be made without departing from the spirit and scope of this invention.

I claim:

1. In a two-way signaling circuit, an oscillator having a frequency determining feedback circuit which includes a primary winding of a transformer and having a first signal source DC coupled to the oscillator for applying signal voltages thereto to modify the frequency of the oscillator characterized in that a secondary winding of the transformer is DC isolated from the feedback circuit, and a second source of signal voltages is DC coupled to the secondary winding of the transformer for modifying the impedance across the secondary winding whereby the reflected impedance in the primary winding is modified, modifying in turn the oscillator frequency and wherein a first output circuit is DC coupled to the primary winding and a second output circuit is DC coupled to the secondary winding to obtain the oscillator output therefrom.

2. In a two-way signaling circuit in accordance with claim 1 wherein each of the first and second output circuits includes means responsive to the oscillator output for developing signal voltages to recover the input signal voltages from the second and first sources, respectively.

* * * * *

UNITED STATES PATENT OFFICE
CERTIFICATE OF CORRECTION

Patent No. 3,618,128 Dated November 2, 1971

Inventor(s) George P. Houcke

It is certified that error appears in the above-identified patent and that said Letters Patent are hereby corrected as shown below:

In the Title, change "Toy" to --For-- so that the Title will read "Two-way Signaling Circuit Employing a Common Oscillator Having a Feedback Transformer For Providing DC Isolation Between Signal Sources".

Signed and sealed this 25th day of April 1972.

(SEAL)
Attest:

EDWARD M.FLETCHER,JR.
Attesting Officer

ROBERT GOTTSCHALK
Commissioner of Patents